MARION GREEN.
Improvement in Implements for Slitting and Joining Rags for Carpets.

No. 114,004. Patented April 25, 1871.

Witnesses,
George Lang.
Francis M. Bifell

Inventor,
Marion Green

UNITED STATES PATENT OFFICE.

MARION GREEN, OF COLDWATER, MICHIGAN.

IMPROVEMENT IN IMPLEMENTS FOR SLITTING AND JOINING RAGS FOR CARPETS.

Specification forming part of Letters Patent No. 114,004, dated April 25, 1871.

*To all whom it may concern:*

Be it known that I, Mrs. MARION GREEN, of the city of Coldwater, in the county of Branch and State of Michigan, have invented a new and useful instrument (called a "Carpet-Rag Looper") to attach carpet-rags together when preparing them for rag carpet, of which the following is a specification:

My invention consists of an instrument made of steel, and of sufficient length and width and size to be used with one hand. It has a pointed knife-blade at one end, sharpened so as to cut loop-holes in the rags lengthwise when lapped together, and, at one edge or at the bottom, a hook, so that when it is passed through the loop-holes cut by the knife in the rags, the hook will draw the loose end of one of the rags through with it, the rags being held between the forefinger and thumb, thereby forming the loop with two rags.

Figure 1:
Figure 2:
Figure 3:
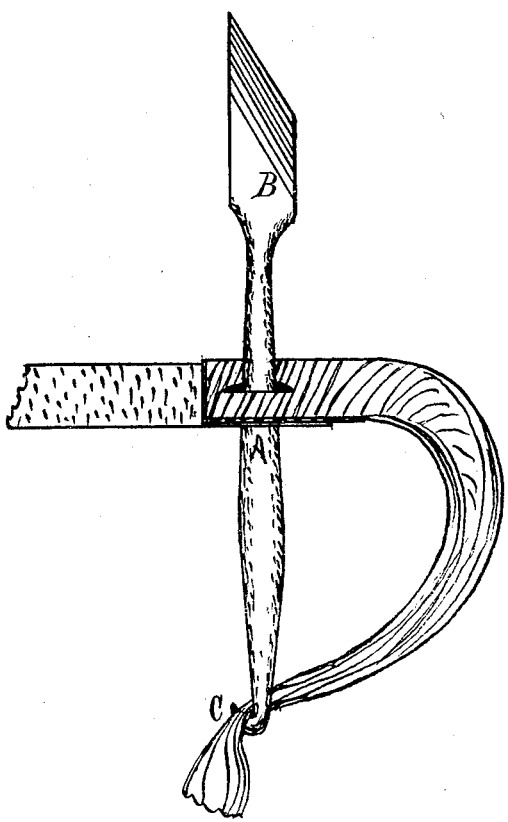

Figure 1 is a side view of my invention or instrument. Fig. 2 is an edgewise view. Fig. 3 is a side view of my instrument, representing the manner of passing the same through two rags lapped, and showing how the hook operates in passing the free end of the upper rag through the loop-holes.

A represents the stem of the looper, B represents the pointed knife-blade end, and C represents the hook.

I claim as my invention—

The hand-instrument for slitting and looping carpet-rags, consisting of the handle A, knife B, and hook C, constructed substantially as described.

In testimony whereof I have hereunto set my hand the 16th day of December, A. D. 1870.

MRS. MARION GREEN.

Witnesses:
G. J. LANGS,
FRANCIS M. BISSELL.